United States Patent [19]

Tolbert et al.

[11] Patent Number: 4,931,342
[45] Date of Patent: Jun. 5, 1990

[54] ACCORDION FOLDED LAMINATE OF FIBER SHEET REINFORCED WITH THERMOPLASTIC FILM

[75] Inventors: Thomas W. Tolbert, Fort Mill, S.C.; Jeffrey S. Dugan, Matthews, N.C.; John V. Cauthen, Van Wyck; James E. Hendrix, Spartanburg, both of S.C.

[73] Assignee: Springs Industries, Inc., Fort Mill, S.C.

[21] Appl. No.: 120,864

[22] Filed: Nov. 16, 1987

[51] Int. Cl.$^5$ ............................................. E06B 3/94
[52] U.S. Cl. ...................................... 428/90; 160/84.1; 428/121; 428/176; 428/181
[58] Field of Search ............... 160/84.1; 428/121, 181, 428/176, 90

[56] References Cited

U.S. PATENT DOCUMENTS

| | | | |
|---|---|---|---|
| 1,632,761 | 6/1927 | Clark | 160/349.2 X |
| 1,927,272 | 9/1933 | Patt | 428/181 |
| 2,101,836 | 12/1937 | Benedict | 428/181 X |
| 3,055,419 | 9/1962 | Rubin et al. | 160/84.1 |
| 3,443,860 | 5/1969 | Luboshez | 160/84.1 X |
| 4,015,653 | 4/1977 | Slysh et al. | 160/213 |
| 4,335,774 | 6/1982 | Price | 160/84.1 |
| 4,361,914 | 12/1982 | Oliver | 211/123 X |
| 4,397,346 | 8/1983 | Chumbley et al. | 160/84.1 |
| 4,582,109 | 4/1986 | Fairbanks | 160/84.1 |
| 4,733,711 | 3/1988 | Schon | 160/84.1 |
| 4,753,281 | 6/1988 | Wagner | 160/84.1 |

Primary Examiner—Henry F. Epstein
Attorney, Agent, or Firm—Thomas & Kennedy

[57] ABSTRACT

An accordion folded laminate of a fiber sheet reinforced with a thermoplastic film and bonded together with adhesive is utilized as a window shade or as a shower curtain or other end use product. In the preferred form, the thermoplastic sheet comprises polyester and the adhesive comprises a low melt polyester adhesive powder. The powder is applied uniformly to the reverse face of the fiber sheet and is heated to a temperature higher than its melt temperature, and the thermoplastic sheet is pressed over the adhesive against the polyester sheet. This laminate is subsequently formed into an accordion folded configuration, with the edges of the accordion folds being heated to a temperature higher than the melt temperature of the adhesive, causing the folds to retain a memory that enhances the appearance and function of the end use product.

14 Claims, 2 Drawing Sheets

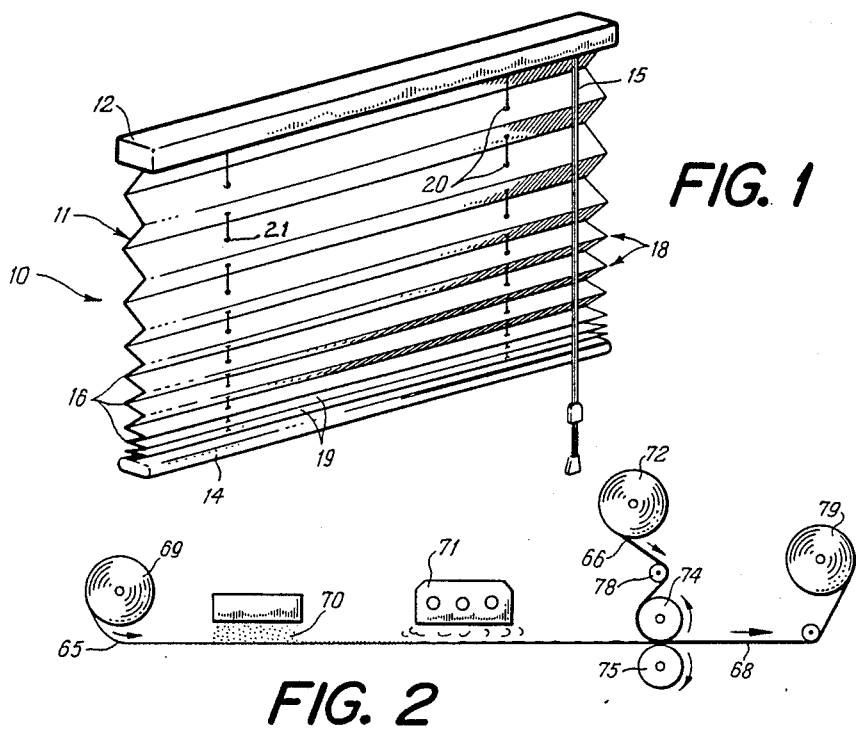
FIG. 1
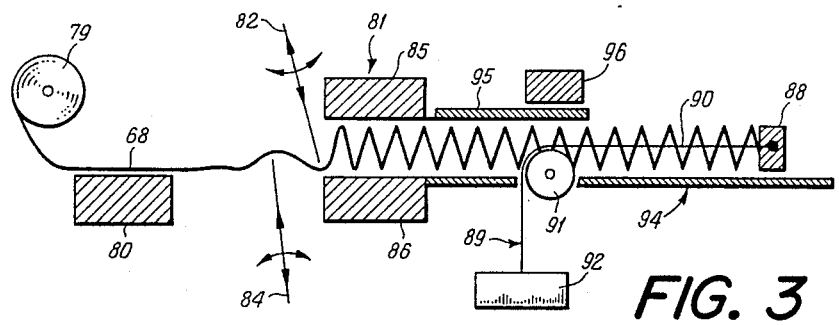
FIG. 2
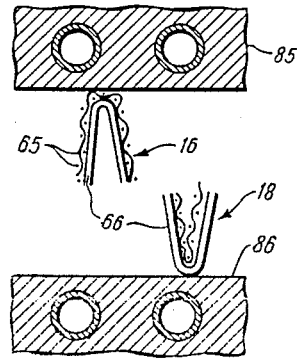
FIG. 3
FIG. 4

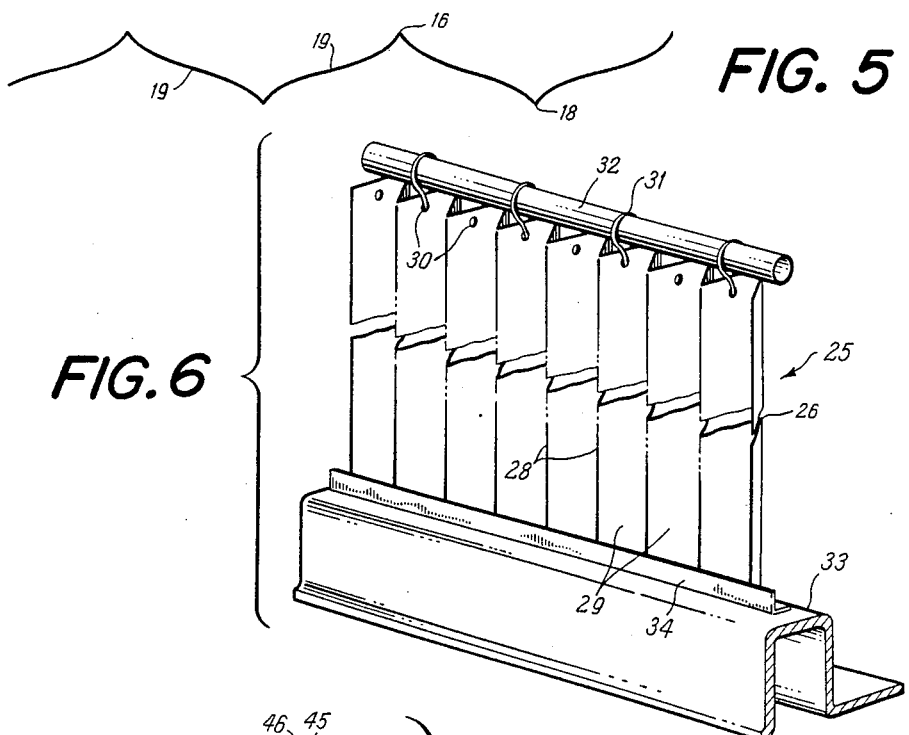
FIG. 5
FIG. 6
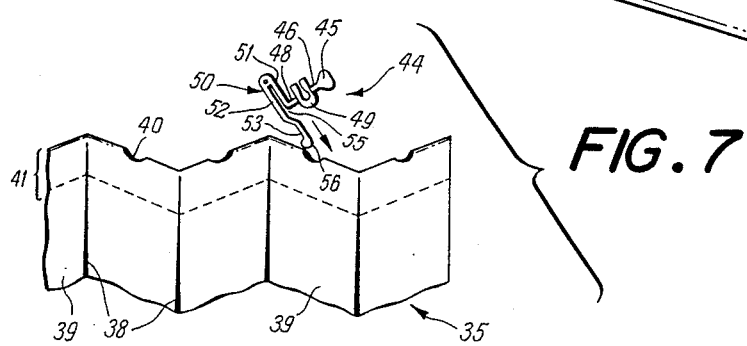
FIG. 7
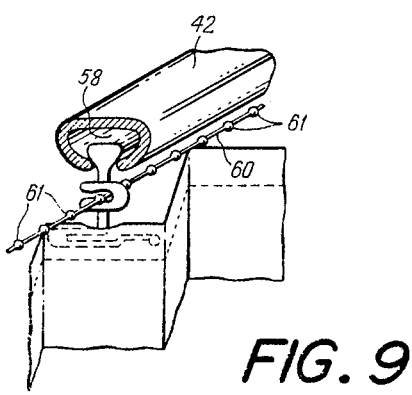
FIG. 9
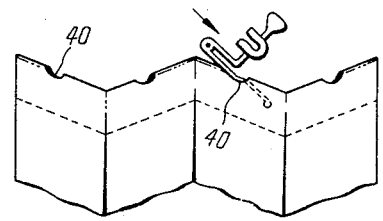
FIG. 8

ACCORDION FOLDED LAMINATE OF FIBER SHEET REINFORCED WITH THERMOPLASTIC FILM

BACKGROUND OF THE INVENTION

This invention relates to window shades, shower curtains and other sheet material products that are formed of accordion folded laminates of fiber reinforced by thermoplastic film, such as polyester film, with an adhesive dispersed between the layers of the laminate, such as low melt polyester adhesive powder. Window shades and shower curtains formed of the accordion folded laminate tend to hold their shape so that the folds do not tend to disappear under the weight of the window shade, and the laminate tends to resume a folded configuration after having been extended.

Accordion folded sheet material has been extensively used in the past as decorative curtains and other items having the folds extending vertically, and also as window shades and similar items that have the folds extending horizontally. The sheet material which is formed in the folded configuration has included various decorative patterns on its surface and provides a very pleasing visual effect. There is a history of using stand-alone panels of resin-stiffened fabric. This fabric has traditionally been polyester (only). This fabric may have been woven, knitted, or non-woven (such as "stitch-bonded" non-woven). The yarns may have been spun staple or continuous filament yarns. The resin-stiffened fabrics may have been finished with either thermoplastic or thermoset resins or combinations of both types of resins. The resins have generally been selected from acrylic or melamine resins.

The potential use of accordion folded sheets seems to be limitless; however, when the sheet material is stretched from a compact accordion fold configuration to an expanded configuration, the folds tend to lose their shapes and become less attractive. This is particularly true with accordion folded window shades and similar items that have their folds extending horizontally. The weight of the lower portion of the window shade sheet material is applied to the upper portion thereof and tends to stretch the accordion folds at the upper portion out to a substantially flat configuration. When in this configuration, the upper portion of a window shade tends to lose its accordion folded identification and appears more nearly in a flat configuration, such that the pattern of the overall shade is not very attractive. Further, the relatively weak folds of the typical accordion folded fabric tends to permit the folds to become everted, which further detracts from the visual appearance of the material.

In many cases it is desirable that the folds of an accordion folded sheet material be maintained in a substantially uniform fold configuration across the entire length or width of the sheet material. This not only provides a uniformity of folds but also tends to present the pattern on the surface of the sheet material in a uniform manner. For example, if a pattern on the surface of the sheet material has a uniform repeat of a visual design and the folds of the accordion folded sheet are not uniformly open, the pattern will not be uniformly presented.

SUMMARY OF THE INVENTION

Briefly described, the present invention comprises an accordion folded laminate formed of fiber which is reinforced with a sheet of thermoplastic bonded thereto, and the method of forming the laminate. In one embodiment the accordion folded laminate comprises a window shade having its folds extending horizontally, and in other embodiments the laminate comprises a shower curtain or other portal covering with its folds extending vertically. The thermoplastic sheet preferably will comprise polyester, and the adhesive that bonds the thermoplastic sheet to the fiber sheet comprises a low melt adhesive. The adhesive is dispersed on one of the sheets and heated to a temperature above its melt temperature. The sheets are pressed together about the adhesive and after being joined together the sheets are permitted to cool. The bonded laminate is moved through a pleater apparatus, whereby the laminate is progressively folded into a compressed accordion folded configuration and panels of uniform widths are formed and the folds at the opposite edges of each panel of the laminated sheet material are again heated to a temperature higher than the melting temperature of the low melt adhesive. The thermoplastic sheet undergoes molecular rearrangement under the thermal and mechanical conditions imposed by this process and the thermoplastic sheet assumes a high degree of crease retention. Furthermore and uniquely, the adhesive tends to lock the folds in a heat set configuration, such that the final product in the form of a window shade, shower curtain or other end use device has a fold memory that urges the panels between the folds away from a fully stretched configuration back toward a relaxed accordion folded configuration. Where the fiber sheet may have thermoplastic properties (such as standard polyester), these fibers may also undergo molecular rearrangement similarly to that of the thermoplastic sheet, and thereby contribute to the overall resiliency of the final creases.

Thus, it is an object of this invention to provide an accordion folded sheet which is formed of a laminate of a thermoplastic sheet and a fiber sheet and an intermediate adhesive, with the folds of the laminate having a memory that tends to return the folds from an outstretched configuration to an intermediate relaxed configuration.

Another object of this invention is to provide an accordion folded laminate of fiber which is reinforced with a polyester film which is visually distinctive, durable and which is inexpensive to produce.

Another object of this invention is to provide an accordion folded laminate of a fiber sheet containing non-thermoplastic fibers reinforced with a polyester film, with the fiber sheet and polyester film bonded to each other with a low melt adhesive, with the final product providing a distinctive accordion folded appearance even when the product has been radically stretched from its accordion folded configuration to a substantially flat configuration.

Another object of this invention is to provide an accordion folded laminate of fiber and polyester which is suitable for use as window shade material having the folds of the laminate extending horizontally and suitable for use as a shower curtain having the folds of the laminate extending vertically.

Other objects, features and advantages of this invention will become apparent upon reading the following specification, when taken in conjunction with the accompanying drawings.

BRIEF DESCRIPTION OF THE DRAWINGS

FIG. 1 is a perspective view of a window shade formed of the accordion folded laminate;

FIG. 2 is a schematic side view of the process of making the sheet material that is to be formed in the accordion folded laminate;

FIG. 3 is a schematic side view of the pleating operation, whereby the sheet material of FIG. 2 is formed in an accordion folded configuration;

FIG. 4 is a detail of the opposite folds of the laminate as heat is applied to the opposite folds;

FIG. 5 is an edge view of the accordion folded laminate, with the laminate being stretched to demonstrate the approximate configuration of the folds and the panels of the laminate;

FIG. 6 is a perspective illustration, with parts removed for clarity, of a shower curtain formed of the accordion folded laminate;

FIGS. 7 and 8 illustrate a second embodiment of the shower curtain, progressively showing how a hanger is inserted into the upper hem of the curtain; and FIG. 9 is a perspective view of the second embodiment of the shower curtain, with parts removed for clarity, illustrating the shower rod, the hanger which supports the shower curtain from the shower rod, and the restraining chain extending between adjacent ones of the hangers.

DETAILED DESCRIPTION OF THE INVENTION

Referring now in more detail to the drawings, in which like numerals indicate like parts throughout the several views, FIG. 1 illustrates a window shade 10 formed from an accordion folded laminate 11, an upper support housing 12, a lower base 14 and a draw string arrangement 15. The accordion folded laminate 11 is formed with oppositely directed folds 16 and 18 at opposite edges of panels 19 and has its folds 16 and 18 extending horizontally, with the lowermost of its panels 19 clamped in the lower base 14 and the uppermost one of its panels 19 clamped in the upper support housing 12. Holes 20 and 21 are formed in each panel 19, adjacent opposite ends of each panel, with the holes 20 being aligned with one another and with holes 21 being aligned with one another. Additional series of aligned holes may be required across the width of very wide window shades, so that additional draw strings might be supplied both for raising and lowering the window shade and for preventing out-of-plane thrusting of the window shade during raising of that window shade. The draw string 15 is connected appropriately to the lower base 14, and the draw string extends from the lower base 14 upwardly through the holes 20 and 21, through the upper support housing 12, and out one end portion of the upper support housing. The draw string 15, upper support housing 12 and lower base 14, function in the conventional manner, so that when the draw string 15 is pulled or released the lower base is raised or lowered.

As illustrated in FIG. 6, the accordion folded laminate also can be used as a shower curtain 25, with the folds 26 and 28 extending vertically with the folds formed at the opposite edges of the panels 29. Holes 30 are formed at the upper end of each panel 29, and conventional hangers 31 extend through some or all of the holes 30 and support the shower curtain from the shower rod 32.

The shower curtain 25 is arranged to hang over the rim 33 of a tub, and an L-shaped bar 34 or U-shaped bar may be mounted on the rim of the tub. The upper flange of the L-shaped bar 34 is placed generally parallel to and below the shower rod 32, and the shower curtain 25 is long enough so that its lower edge will extend below the upper edge of the L-shaped bar 34. With this arrangement, the L-shaped bar 34 prevents the shower curtain from drifting outside the tub enclosure, and it prevents water-spillage outside the tube enclosure.

While the shower curtain 25 of FIG. 6 is hung in a conventional manner, there are times when it is desirable to use very thin accordion folded laminate material in the shower curtain, and the holes 30 may not be able to withstand abrupt pulling forces that could be applied to the holes by a vigorous urging of the shower curtain to an opened or closed configuration. Further, the conventional hangers 31 sometime do not slide very easily along the upper surface of the shower rod 32, which tends to require more force to be applied to the shower curtain to open or close the shower curtain.

As illustrated in FIGS. 7-9, another embodiment of the shower curtain is disclosed, where the shower curtain 35 includes vertical folds 38 and intermediate panels 39, a hem 41 formed along the upper edge thereof, and holes 40 formed in the upper edge of the hem. Especially designed hangers 44 are inserted in the holes 40 and function to support the shower curtain from shower rod 42. Each hanger 44 is approximately of inverted T configuration, including a head 45, upper and lower stems 46 and 48, C-shaped clamp 49 positioned between the upper and lower stems 46 and 48, and lower hanger bar 50. Lower hanger bar 50 comprises three hanger legs 51, 52 and 53, with upper hanger leg 51 connected at one end to the lower end portion of stem 48 and extending horizontally therefrom, lower hanger leg 52 which returns parallel to upper hanger leg 51, and opposite hanger leg 53 which is coextensive with hanger leg 51. A slot 55 is formed between upper hanger leg 51 and lower hanger leg 52, and a slug 56 is formed at the distal end of hanger leg 53.

As illustrated in FIG. 9 the hangers 44 are suspended from the shower rod 42. The shower rod comprises a channel bar with a downwardly facing lower slot 58. The hanger 44 is inserted into the slot 58 from the end of the shower rod, by placing the enlarged head 45 in the cavity of the shower rod and passing the upper stem 46 through the slot 58. The C-shaped clamp 49 is suspended just below the shower rod 42.

As illustrated in FIGS. 7 and 8, when a hanger 44 is to be inserted in the hem of the shower curtain 35, the slug 56 is first inserted through a hole 40 at the upper edge of the hem, the vertical fold 38 between the adjacent panels is flattened so as to permit the distal end of the hanger to protrude into the hem above the next adjacent panel, the upper edge of the hem is received in the slot 55 (FIG. 8), the bend between hanger leg 51 and lower hanger leg 52 is then urged down into the hole, and then the hanger is pulled rearwardly until the hanger leg 51 is fully received within the hem (FIG. 9). This places the lower stem 48 in the vicinity of the hole 40. When the shower curtain is relaxed so as to permit its folds on opposite sides of the hanger 44 to regain their normal folded configuration, the shape of the upper edge portion of the shower curtain tends to confine the hanger in its panel. The slug 56 at one end and the bend between hanger leg 51 and lower hanger leg 52 at the other end tend to reduce any likelihood of the hanger 44 from puncturing the material of the shower curtain.

The C-shaped clamp 49 of each hanger 44 limits the vertical motion of upper stem 46 through the slot 58 so that the enlarged heads 45 cannot become tangled within the cavity of slot 58. Clamp 49 also can be used to receive a spacer cord 60. The spacer cord 60 comprises a flexible plastic cord with protrusions 61 formed thereon. When the shower curtain is stretched so as to open its panels, the spacer cord 60 will limit the distance between adjacent ones of the hangers 44. If the hangers 44 are relatively closely spaced along the length of the spacer cord 60 at a distance which is less than the widths of the intervening panels, the spacer cord will not permit the upper portion of the shower curtain to be completely stretched to a flat configuration, but will permit the shower curtain to open only to a desired configuration.

As illustrated in FIG. 2, the accordion folded laminate which forms the window shade material of FIG. 1 or the shower curtain material of FIG. 6 is formed of a thermoplastic sheet 66 and a fabric sheet 65, with the sheets forming a laminate 68 that becomes the laminate 11 of the window shade or the laminate 25 of the shower curtain. The thermoplastic material 66 preferably is a polyester film having a thickness of 1.42 mil, a nominal thickness of 1.5 mil. A suitable brand of material is Type 329 Melinex ® Polyester Film sold by ICI Americas Corporation of Wilmington, Del., USA. This is a white, opaque film. Other polyester films comprise Mylar ® Type A from E. I. DuPont de Nemours Corporation, Wilmington, Del., USA. Further, Mylar EB-11 produced by DuPont is a surface engraved film. Both of the DuPont films are clear, translucent films. The polyester films described above have a stiffness or flex modulus sufficient so that the film does not collapse during the lamination and accordion fold manufacturing processes and in subsequent use in the laminate form. There are other thermoplastic sheet materials that might find acceptance in other end use products, such as polypropylene, polyethylene, polyvinyl chloride.

The fabric sheet material 65 is taken from a supply 69 and advanced along its length through a processing path at a rate of between about 75 to 300 feet per minute. An adhesive 70 is applied to the upper face of the fabric sheet 65. In the preferred embodiment the adhesive comprises low melt polyester adhesive powder which is uniformly sprinkled onto the upper face of the fabric sheet 65.

The adhesive 70 is heated by radiant heater 71 which is placed above and adjacent to the upper face of the fabric sheet 65. In the preferred embodiment the fabric sheet material 65 has a melting point or scorching temperature higher than 450° F. The low melt polyester adhesive powder has a melting point of about 250° F. Therefore, the radiant heater 71 is adjusted so as to apply that amount of heat necessary to raise the low melt polyester adhesive powder to a melted configuration, but to maintain the temperature of the fabric sheet material 65 low enough so as to avoid reaching its melting temperature. When the fabric sheet material 65 emerges from radiant heater 71, its low melt adhesive powder will have been heated to the temperature necessary for melting the powder into liquid form.

As the fabric sheet material 65 emerges from the heater 71, the thermoplastic sheet 66 will be overlaid onto the upper face of the fabric sheet material 65 by advancing the thermoplastic sheet from a supply 72 about heated roll 74, and then downwardly about the roll 74 between the upper roll 74 and lower roll 75, so that the sheets 65 and 66 are pressed together by upper and lower rolls 74 and 75. The amount of pressure applied by the rolls to the sheets is adjustable (not shown) in the conventional manner. Further, upper roll 74 is treated with steam at approximately 212° F., so that the roll maintains a temperature slightly above 200° F. The effect of the steam is that the thermoplastic sheet 66 is preheated as it makes contact with the upper roll 74 under the influence of an optional idler roll 78, whereas the lower roll 75, being at a temperature lower than the preheated fabric sheet material 65 tends to cool the fabric sheet material 65. The net result is that the sheets, after having passed between upper and lower rolls 74 and 75 tend to rapidly equalize in temperature and pass together to a take-up roll 79.

When the laminate 68 formed by the process illustrated in FIG. 2 has cooled, the resulting laminated sheet material 68 has one decorative side formed by the fabric and one fluid impervious side formed by the thermoplastic sheet material. As illustrated in FIG. 3, the laminate 68 is advanced from its roll 79 across a preheater 80 through a pleater 81. Pleater 81 is of conventional construction and comprises a pair of fold blades 82 and 84 that reach into the laminate 68 and alternately form the adjacent folds of what becomes the accordion folded laminated sheet. Upper and lower heating blocks 85 and 86 apply heat to the folds of the accordion folded laminate, so as to raise the temperature of the adhesive above its melt temperature. A compression bar 88 is placed at the leading end of the laminate material, and a weight assembly 89 includes, at opposite ends of the compression bar 88 cords 90 attached at one end to the compression bar 88 and extending around a pulley 91 and extending vertically therefrom to lower weights 92. This causes the compression bar 88 to apply compressive force to the oncoming corrugated laminated sheet material, tending to press the folds of the sheet material, causing the panels of the sheet material to be in more perfectly parallel, abutting relationship.

As illustrated in FIG. 4, the upper and lower heating blocks 85 and 86 are heated by heated liquid flowing through circulation pipes or other conventional means to temperatures above the approximately 250° melting temperature of the adhesive that bonds the thermoplastic sheet and the fabric sheet of the laminated sheet material. The temperatures of heating blocks 85 and 86 are maintained low enough so as not to cause melting or scorching of thermoplastic sheet 66 or fabric sheet 65. The temperature of heating blocks 85 and 86 is set as high as practical to encourage molecular rearrangement of thermoplastic sheet 66 any thermoplastic fibers contained in fabric sheet 65. The folds 16 on one side of the accordion folded laminate have the fabric 65 in direct contact with the upper heating block 85 whereas the folds 18 have the thermoplastic sheet material 66 in direct contact with the lower heating block 86. With this arrangement, the folds of the accordion folded laminate are directly heated primarily by conduction heat transfer from the heating blocks 85 and 86. The remaining surfaces of the accordion folded laminate are not directly heated but there is heat transfer from the tips of folds 16 and 18 toward the center of the accordion folded, compressed laminate.

When the laminate is first folded by the folding blades 82 and 84, bending stress is formed at each fold. However, when the heat is applied by the upper and lower heating blocks 85 and 86, the stress in the adhesive is removed when the temperature of the adhesive exceeds the melting point of the adhesive. Further, the temperature applied by the heating blocks 85 and 86 can be increased to that temperature necessary to further relieve the stress of the thermoplastic sheet material 66.

The fabric 65 of upper folds 16 tends to be stretched about the thermoplastic sheet material 66, but the application of heat to the upper folds tends to permit the thermoplastic sheet 66 to shrink inwardly and thereby reduce the stress of the composite. Likewise, the thermoplastic sheet 66 tends to stretch about the fabric 65 along the lower folds 18, but the application of heat to the thermoplastic sheet 66 permits the sheet to stretch and relieve the stress of the composite. Therefore, the fiber sheet and the thermoplastic sheet tend to slip with respect to each other at the folds when the temperature of the adhesive is raised above the temperature of liquification of the adhesive. Further, the hot adhesive tends to flow at the folds between the thermoplastic sheet and fabric sheet, thereby accommodating the new fold configuration.

After the accordion folded laminate moves on through the space between upper and lower heating blocks 85 and 86, the folded laminate passes over work surface 94 and beneath the lower surface of upper clamp plate 95 with a weight 96 tending to urge the upper clamp plate 95 down into clamping relationship with respect to the upper folds of the accordion folded laminate. This tends to control the lateral movement of the accordion folded sheet material during the cooling thereof, assuring that the folds of the sheet material will remain in their desired configuration until they reach a temperature level lower than the melt temperature of the adhesive.

After the accordion folded laminate has been permitted to cool, it has a fold memory and tends to retain its compressed accordion folded configuration. As illustrated in FIG. 5, when the panels of the laminated sheet material are stretched apart from one another, the folds 16 and 18 tend to retain their creased or sharply folded configuration, and the intermediate panels 19 tend to assume a shallow S-shape with the edges of the panels merging into the folds 16 and 18. Thus, the fold memory tends to cause the stretched out accordion folded laminate to assume a visual appearance whereby the edges of the panels are visually discernible even when the laminate has been substantially stretched away from its accordion folded configuration. This characteristic of the sheet material is highly desirable with respect to the visual appearance of a window shade, particularly at the upper portion of the window shade when the weight of the lower portion of the window shade has stretched the upper portion toward a more flat configuration. Even the upper, expanded portion of the window shade has a discernible accordion folded visual appearance because of the sharper creases of the folds.

While FIGS. 2 and 3 of the drawing disclose the fabrication of the laminate and then the separate arrangement of the laminate into an accordion folded configuration, the processes of FIGS. 2 and 3 could be made continuous, so that the laminate formed in FIG. 2 could be moved directly into the pleater of FIG. 3 without an intermediate accumulation of the laminate in a take-up roll and a subsequent advancing of the laminate out of the take-up roll.

When a polyester sheet of 1.42 mil and a woven fiber cloth which is a blend of cotton and synthetic fibers of a thickness of from 5 to 10 mil have been formed in a laminate as described above with the use of the low melt polyester adhesive powder (Eastobond ® Type 252 Powder Adhesive), and the laminate formed in an accordion fold configuration as described and allowed to cool to room temperature so as to impart a memory to the folds of the laminate, the springiness of the accordion folded laminate is calculated as follows. A sample comprising six panels (a panel comprising the sections of the accordion folded laminate between adjacent folds) plus half panels at each end are cut from the material. The half panels at the opposite ends are grasped by the jaws of an Instron tension meter. The folds of the sample extend horizontally and the width of the sample is cut to a width which will produce a tension force in the range of the load cell of the Instron tension meter. At first, only the top half pleat at the upper end of the sample is attached to the meter, so that the tension detected determines the weight of the sample. When both ends of the sample are clamped in both clamps of the meter, the upper clamp is raised until the panels of the accordion folded laminate are extended to 80% of their full extension (full extension equals the distance across each panel face times the number of panels). The sample is left extended in this matter for five minutes at 80% extension. The tension at 80% extension is calibrated so as to determine a decay factor over five minutes. The tension is calibrated as follows:

T80=(TB−TA)/SW
T80=Tension at 80% extension
TB=Tension+Weight
TA=Weight
SW=Sample Width The decay factor over five minutes is calibrated as follows:

D5=100%×(TB−TC)/(TB−TA)
D5=Decay Factor
TB=Tension+Weight
TC=Tension after five minutes time lapse
TA=Weight of Sample Using the above noted calibrations, a pleated substrate with fabric adhered thereto as described above is considered suitable for use in window shades and will provide a pleasing visual appearance if the tension at 80% extension remains at a ratio of above 1.0 when the dimensions and test parameters are stated using the centimeter-gram-second system of measurement. Those with a ratio of below 1 are considered to be "too loose" to provide the visual results desired.

Tests were performed on samples of the accordion folded laminates as follows:

EXAMPLE 1

Polyester film of 1.42 mil was joined by Eastobond Type 252 powder adhesive (Eastman Chemical Products, Kingsport, Tenn., USA) to a woven cloth of a blend of cotton and synthetic fibers (polyester). The sample, after having been accordion folded, as described above, was cut to a width of 20.3 centimeter and included six panels with half panels at each end. The specimen was placed in an Instron tension meter and stretched to 80% with the following results being detected:

$$T80 = (TB - TA)/SW$$
$$= (43.6 - 14.7) \text{ gram}/20.3 \text{ centimeter}$$
$$= 1.4$$

The decay factor was calibrated as follows:

$$D5 = 100\% \times (TB - TC)/(TB - TA)$$
$$= 100\% \times (43.6 - 40.2) \text{ gram}/(43.6 - 14.7) \text{ gram}$$
$$= 11.8\%$$

The above noted test was repeated with findings of T80 and D5 being within approximately plus or minus of 5% of the above noted computations.

The thermoplastic sheet material can be a colored translucent material so as to provide an attractive backing color for the fabric sheet. For example, the fabric sheet can be relatively thin and can permit light to pass therethrough, and the thermoplastic sheet, being of a selected color, will impart a background color to the fabric sheet. The fabric sheet can be of a woven, nonwoven, knitted or leno weave, of organic fiber, such as cotton, or of rayon or cellulosic materials. The thermoplastic sheet, particularly polyester sheet material, receives and retains the pleated configuration and tends to hold the fiber sheet in the desired configuration.

The adhesive which is used to hold the layers of fabric and thermoplastic together also can comprise: low melt polyester adhesive powder, low melt polyvinyl chloride powder, low melt polyvinylidene chloride powder, low melt acrylic powder, low melt polyolefin powder, webs made from similar polymers, thin films made from similar polymers, thin coatings deposited onto the surface of the thermoplastic sheet itself, thin layers of similarly behaving polymers coextruded intimately with the thermoplastic sheet, webs of coextruded fibers having a low melting component at its surface with the low melting component of the total fiber-cross-section having adhesive properties when subjected to this same general processing.

As with the window shade of FIG. 1, the shower curtain of FIG. 6 can utilize a rigid member (not shown) at one or both of the opposite vertical side edges of the curtain material, so that the rigid member can function as a handle to uniformly move the end panel of the shower curtain. The rigid member can be attached to the shower stall by a conventional latch, or by other attachment means. Further, a finish can be applied to the fabric of the window shade or shower curtain so as to enhance its appearance as well as to retard the formation of mold or mildew thereon.

While this invention has been described in the form of the preferred embodiments, it will be understood that many modifications, additions, and deletions may be made thereto without departure from the spirit and scope of the invention, as set forth in the following claims.

We claim:

1. In a window shade assembly including a shade support for mounting at a portion of a window, an accordion folded shade having a series of panels formed by alternately directed folds, said shade being oriented with the folds extending horizontally and supported at its upper end to the shade support for hanging downwardly at the window opening, draw string openings formed in said panels, a draw string assembly connected in supporting relationship to the lower portion of said shade and extending upwardly through the openings of the panels of said shade and through said shade support for raising and lowering the shade, the improvement therein of said shade comprising a laminate formed of a fiber sheet and a thermoplastic sheet with an intermediate layer of adhesive bonding said sheets together uniformly over their facing surfaces, said adhesive having a temperature of liquification lower than the temperature of liquification of said thermoplastic sheet, said laminate characterized by having been folded into an accordion folded configuration and the panels of the accordion folded laminate compressed to substantially flat overlying stacked relationship with respect to each other and while the panels are compressed heat having been applied to the folds of the compressed stack of panels to raise the temperature of the adhesive in the folds of the panels above the temperature of liquification of the adhesive and sufficiently high to allow for significant molecular rearrangement of the thermoplastic sheet to relieve stresses in the thermoplastic sheet in the vicinity of the folds, and then cooled to a temperature lower than the temperature of liquification of the adhesive so that the adhesive was first liquefied and later solidified to create a memory in each fold, with the fold memory of each fold being sufficient to require the panels to assume an S-shape when the panels are stretched away from one another.

2. The window shade assembly of claim 1 and wherein said thermoplastic sheet comprises polyester having a melt temperature of approximately 450° F. and wherein said adhesive is selected from a group consisting of:

powder polyester having a melt temperature of approximately 250° F., a web of low-melt polyester binder fiber, a web of fibers containing fibers which are characterized as having been coextrusions of low and high melting polymers with the low melt component exposed at the fiber surface, low melt polyvinyl chloride adhesive powder, low melt polyvinylidene chloride adhesive powder, low melt polyolefin adhesive powder, low melt acrylic adhesive powder and webs made from fibers which liquefy and solidify at a temperature lower than the melt temperature of the thermoplastic sheet material.

3. The window shade of claim 1 and wherein said thermoplastic sheet comprises polyester sheet of a thickness of approximately 1.5 mils and said fiber sheet comprising natural or synthetic woven fibers of a thickness from about 5 to 20 mils.

4. The window shade of claim 1 and wherein the shade is characterized by the folds having been raised to a temperature between 275° F. and 320° F.

5. The window shade of claim 1 and wherein said shade is characterized by said fiber sheet and said thermoplastic sheet having slipped with respect to each other at the folds when the temperature of the adhesive was raised above the temperature of liquification of the adhesive.

6. The window shade of claim 1 and wherein said thermoplastic sheet comprises polyester and wherein said adhesive comprises polyester powder having a melt temperature lower than the melt temperature of said polyester sheet, said shade further characterized by the polyester powder distributed on the polyester sheet and the polyester powder heated to a temperature above its melt temperature but lower than the melt temperature of the polyester sheet, said fabric sheet pressed into contact with said polyester sheet while the polyester powder is at a temperature higher than its melt temperature.

7. The window shade of claim 6 and wherein said polyester powder is applied to said fabric sheet.

8. The window shade of claim 1 and wherein said thermoplastic sheet is transparent.

9. The window shade of claim 1 and wherein said thermoplastic sheet is translucent.

10. The window shade of claim 1 and wherein said thermoplastic sheet is selected from a group consisting of colored, printed, embossed and flocked sheet material.

11. The window shade of claim 1 and wherein said fiber sheet has opposing surfaces with one of said surfaces having a decorative visual pattern and the opposite surface being bonded to said thermoplastic sheet.

12. An accordion folded laminated sheet comprising a polyester sheet and a fibrous sheet in overlying relationship and a layer of adhesive between said sheets uniformly bonding said sheets together, said laminated sheet formed with a plurality of panels joined at their edges with oppositely directed folds, said polyester sheet characterized by having been stretched about alternate folds of the fibrous sheet and compressed in the other alternate folds of the fibrous sheet at opposite edges of said panels, and the layer of adhesive and the polyester sheet having been heat set at the folds of the laminated sheet to have a fold memory in the folds so that the panels when stretched apart form an S-shape when the edges of the panels merging into the folds and with the edges of the panels being visually discernable even when the sheet has been substantially stretched away from its accordion folded configuration, and the panels are urged back toward positions parallel to one another by said fold memory.

13. A shower curtain formed of the laminated sheet of claim 12 for mounting to a horizontally extending shower rod with the folds extending vertically, hanger-receiving holes formed at the end of at least some panels for receiving hangers therein suspended from the shower rod.

14. A window shade formed of the laminated sheet of claim 12 for mounting at a window opening with the folds extending horizontally.

* * * * *